UNITED STATES PATENT OFFICE.

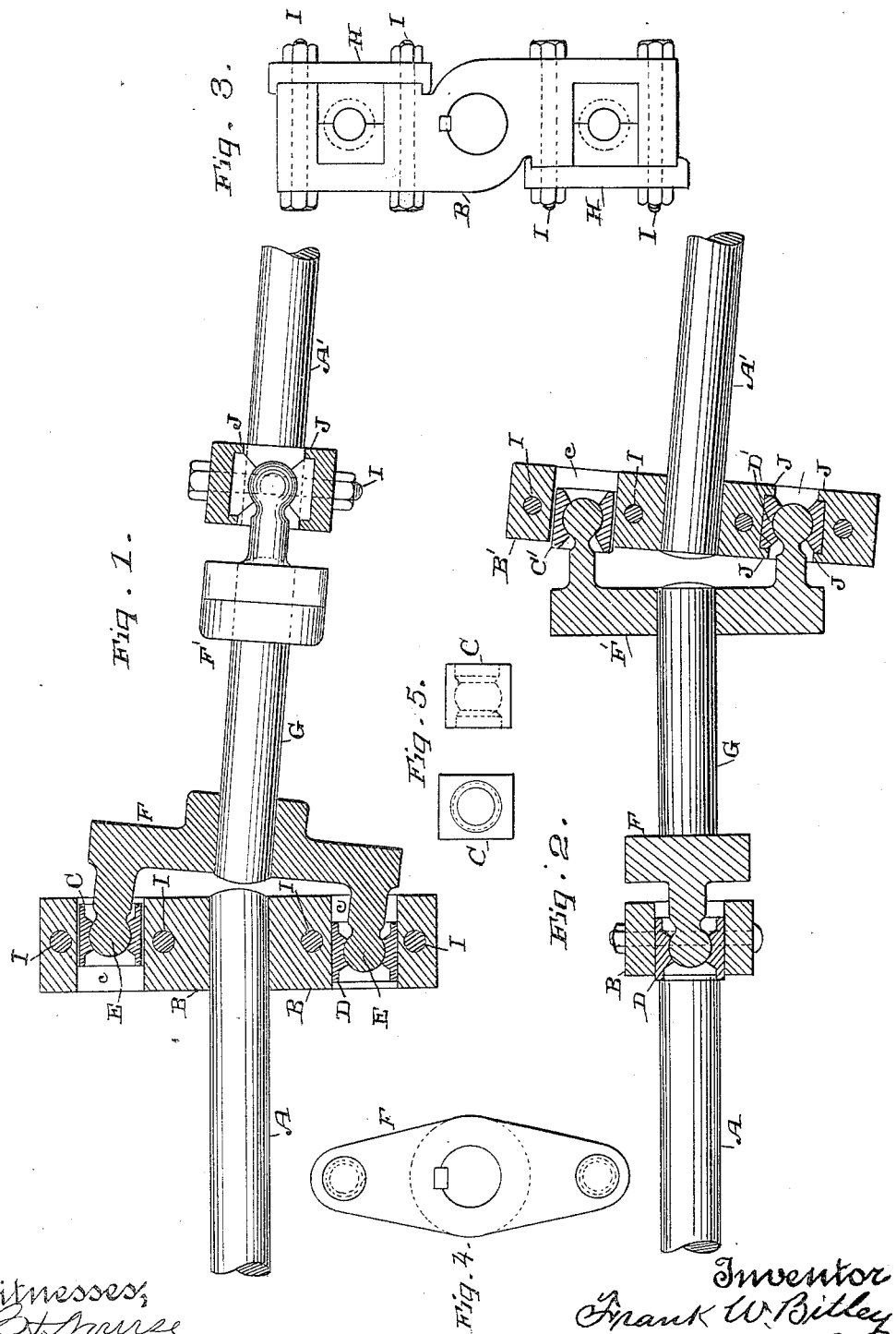

FRANK WILLIAM BITLEY, OF SAN FRANCISCO, CALIFORNIA.

FLEXIBLE SHAFT-COUPLING.

SPECIFICATION forming part of Letters Patent No. 419,241, dated January 14, 1890.

Application filed September 6, 1889. Serial No. 323,120. (No model.)

*To all whom it may concern:*

Be it known that I, FRANK WILLIAM BITLEY, of the city and county of San Francisco, State of California, have invented an Improvement in Flexible Shaft-Couplings; and I hereby declare the following to be a full, clear, and exact description of the same.

My invention relates to a universal or flexible coupling for shafts, whereby they may be made to run in different lines without breakage or accident.

It consists in certain details of construction, which will be more fully explained by reference to the accompanying drawings, in which—

Figure 1 is a view of a portion of the shaft, with a sectional view of the couplings. Fig. 2 is a similar view taken at right angles with Fig. 1. Fig. 3 is a transverse section of the shaft, showing an end view of the driving-head. Fig. 4 is an end view of the driving-head. Fig. 5 is a detached view of the blocks C.

A A' is the main shaft, and G is an intermediate or coupling shaft, made of any convenient length which allows the two parts of the main shaft to have their longitudinal axis in different lines, while the propelling-power is transmitted from one part to the other through the intermediate shaft G, which is effected by means of the transverse driving-head B, secured upon the main shaft. In the ends of this driving-head are formed rectangular openings c, within which are fitted the sliding blocks C and D. Upon the ends of the shaft G are couplings with the ball-headed pins E. The couplings on the ends of the shaft G are alike, but placed at right angles to each other. This shaft can be made any convenient length.

The shaft G standing at a slight inclination with the shaft A, it will be seen that when the two are rotated the blocks C and D will slide in their chambers c alternately from one end to the other as the shaft rotates, thus accommodating themselves to the different lines in which the shafts rotate, and at the same time allowing power to be transmitted from one to the other without undue strain upon either. One of the blocks C has a slight clearance on the side nearest the shaft, which allows for the relative change in position in the parts; but the other block D is fitted to slide in its opening without any clearance, which always keeps the shaft G running true. At the opposite end of the shaft G are similar coupling-heads B' and F', which are placed upon the shaft at right angles with the heads B and F, with corresponding blocks C' and D' and connecting-pins, and connection is thus made between the shaft G and the shaft A'. The sliding blocks C and D are made in two parts, and the head B is formed, as shown, with a removable cap H upon one side of each of the openings in which the blocks C and D are fitted to slide, and by means of bolts I this cap is secured in place. The block D' is held stationary, and is prevented from sliding by means of the ribs J, which extend across each end of the opening in the end of the head B'. This prevents the blocks from moving fore and aft, so as to slide entirely out of place.

It will be seen that the change of direction between the shafts A and A' will depend upon the length of the pins E and E' and the movement of the blocks C and D in the openings of the driving-heads, and by means of this coupling the heavy strain upon the shaft caused by its bearings getting out of line can be avoided and the chances of breakage greatly reduced. It is especially valuable as applied to the shafting of ocean steamers. By its construction it allows the lost motion from the thrust-bearing of the propeller to be taken up in the sliding block, thus preventing any fore-and-aft motion being transmitted to the crank-shaft, and the piston-rods and valve-stems are thus maintained in their natural position.

The device is valuable for milling and manufacturing purposes where it may be desired to run shafting at different angles. It may also be applied in steamers of light draft where it is necessary to incline the shafting in order to submerge the propeller sufficiently, as by means of this coupling that portion of the shaft with which the engines are connected may be maintained horizontal, while the portion carrying the propeller may be inclined as much as is necessary to properly submerge the propeller. This device is placed forward of the thrust-bearing of the shaft.

Having thus described my invention, what I claim as new, and desire to secure by Letters Patent, is—

1. The shafts A and A' and an intermediate shaft, driving-heads fixed upon the separate shafts, slides adapted to travel in rectangular openings made in the ends of said heads, and corresponding heads fixed to the intermediate shafts and having pins with globular heads which fit into corresponding concavities in the sliding blocks, substantially as described.

2. The main shafts A A' and the intermediate shaft, transverse heads fixed upon the ends of the main shaft and having rectangular openings made through them approximately parallel with the shaft, sliding blocks fitted into said openings, one of said blocks sliding snugly in the openings and the other having a clearance upon the side nearest to the shaft, and globular heads fitting corresponding concavities in the sliding blocks and connected by pins with the transverse driving-heads fixed upon the intermediate shaft to correspond with those upon the main shaft, substantially as described.

3. In a shaft-coupling, the transverse driving-head keyed to the main shaft, and a corresponding head keyed to the adjacent driven shaft, said main driving-head having rectangular openings formed therein, having adjusting-caps with retaining-bolts, adjustable sliding blocks fitted into said openings and having interior concavities, and pins projecting from the driven shaft-head and having globular ends which fit the concavities of the sliding blocks, whereby power is transmitted between two shafts not in the same line, substantially as described.

4. The shafts A A', having the driving-heads fixed to their adjacent ends, an intermediate shaft with corresponding heads fixed to its ends at right angles with each other and having ball-headed pins, blocks which are fitted into the heads of the shafts A A', as shown, one of these blocks being fixed and the remainder adapted to slide within the slots when the shafts are not in the same line, substantially as described.

In witness whereof I have hereunto set my hand.

FRANK WILLIAM BITLEY.

Witnesses:
S. H. NOURSE,
H. C. LEE.